United States Patent [19]

Kim et al.

[11] Patent Number: 5,470,941
[45] Date of Patent: Nov. 28, 1995

[54] THERMOPLASTIC BIODEGRADABLE RESINS AND A PROCESS OF PREPARATION THEREOF

[75] Inventors: Hyo Y. Kim; Ki H. Hwang; Hoon Chae, all of Kyungki-Do; Soo I. Sho, Seoul; Jung N. Jun, Kungki-Do, all of Rep. of Korea

[73] Assignee: Sunkyong Industries, Kyungki-Do, Rep. of Korea

[21] Appl. No.: 172,281

[22] Filed: Dec. 23, 1993

[30] Foreign Application Priority Data

Dec. 24, 1992 [KR] Rep. of Korea .................. 92-25478
Oct. 23, 1993 [KR] Rep. of Korea .................. 93-20638

[51] Int. Cl.⁶ .................................................. C08G 63/02
[52] U.S. Cl. .......................... 528/272; 528/275; 528/277; 528/279; 528/281; 528/283; 528/302
[58] Field of Search ............................. 528/272, 220, 528/275, 302, 277, 279, 281, 283

[56] References Cited

U.S. PATENT DOCUMENTS

| | | | |
|---|---|---|---|
| 3,859,257 | 1/1975 | Schade et al. | 528/272 |
| 3,959,200 | 5/1976 | Scott | 528/272 |
| 4,883,857 | 11/1989 | Guillet et al. | 528/272 |
| 5,306,787 | 4/1994 | Takiyama et al. | 528/272 |

*Primary Examiner*—James J. Seidleck
*Assistant Examiner*—John M. Cooney, Jr.
*Attorney, Agent, or Firm*—Oblon, Spivak, McClelland, Maier & Neustadt

[57] ABSTRACT

A thermoplastic biodegradable resin having a number average molecular weight of 25,000–45,000, which is prepared by polycondensing one or a plurality of dicarboxylic acids represented by formula (I) with one or a plurality of diols represented by formula (II):

$$ROOC-(-CH_2-)_n-COOR \qquad (I)$$

$$HO-(-CH_2-)_m-OH \qquad (II)$$

wherein R and R' are both hydrogen or are both methyl, n is 2 to 8 and m is 2 to 6.

9 Claims, No Drawings

THERMOPLASTIC BIODEGRADABLE RESINS AND A PROCESS OF PREPARATION THEREOF

BACKGROUND OF THE INVENTION

1. Field of the Invention

The present invention relates to thermoplastic biodegradable resins having a number average molecular weight of 25,000 to 45,000 and to method for making the same.

2. Discussion of the Background

Recently, environmental pollution problems have taken on increasing worldwide concern, especially because the plastics used for all purposes are not degradable. Such undegradable plastics therefore contribute to the destruction of the natural environment. Attention is therefore now being directed to ways in which the problem of the disposal of waste undegradable plastics can be solved.

An aliphatic polyester is known which is biodegradable (Journal of Macromol, SCI-Chem., A-23(3), 1986, 393–409). It has a variety of uses in medical, agricultural, fishery packaging material and other applications are being developed. However, because the conventional aliphatic polyester has a low melting point and a high melt index, because of the structure of the main chain and crystallinity, and has low heat-resistance and unsatisfactory mechanical properties, the utility of this polymer material has been limited. (R&D Evaluation Report No. 47 Chart 3).

Japanese laid-open patent No. 4-189822 and 4-189823 disclose a process for the preparation of aliphatic polyester. But here, because the polyester has a low melting point and a molecular weight of less than 20,000, the polyester is not used as industrial material. A method is known in which an isocyanate is introduced into the polyester.

However, because the method introduces isocyanate, it is not desirable to use the modified substance as an industrial material. Isocyanate is harmful to the human body, and further it is hard to cleave the ester linkage in comparison to the polyester into which the isocyanate is not introduced. A need therefore continues to exist for a biodegradable polyester of improved mechanical properties and heat resistance.

SUMMARY OF THE INVENTION

Accordingly, one object of the present invention is to provide a biodegradable aliphatic polyester having improved properties by controlling the reaction mole ratio of dicarboxylic acid and diol, the amount of catalyst and the reaction temperature, and by providing for separate times of catalyst addition to the reaction mixture.

Another object of the invention is to provide a polyester product of increased number average molecular weight ranging from 25,000–45,000 by a polycondensation reaction, while avoiding the addition of an isocyanate or aromatic polyester component.

Briefly, these and other objects of the invention as hereinafter will become more readily apparent can be attained by a biodegradable thermoplastic having a number average molecular weight of 25,000–45,000 which is prepared by polycondensing one or a plurality of dicarboxylic acids represented by formula (I) with one or a plurality of diols represented by formula (II):

$$ROOC-(-CH_2-)_n-COOR \quad (I)$$

$$HO-(-CH_2-)_m-OH \quad (II)$$

wherein R and R' are both hydrogen or are both methyl, n is 2 to 8 and m is 2 to 6.

DESCRIPTION OF THE PREFERRED EMBODIMENTS

In the present invention, a thermoplastic biodegradable resin having a number average molecular weight of 25,000–45,000 is prepared by polycondensation of a dicarboxylic acid represented by formula (I) or mixtures thereof with a diol represented by formula (II) or mixtures thereof:

$$ROOC-(-CH_2-)_n-COOR \quad (I)$$

$$HO-(-CH_2-)_m-OH \quad (II)$$

wherein R and R' are both hydrogen or are both methyl, n is 2 to 8 and m is 2 to 6.

During the course of the esterification or the ester-exchange reaction in accordance with the process of the present invention, a dicarboxylic acid of 4 to 10 carbon atoms is preferred and one or a plurality of dicarboxylic acids optionally may be employed. A preferred reactant is succinic acid or dimethyl succinate when using a single reactant of formula (I) and is succinic acid or dimethyl succinate as a component acid when using a plurality of dicarboxylic acid reactants.

The weight ratio of succinic acid or dimethyl succinate to other alkylene dicarboxylic acid preferably ranges from 70:30–100:0. If the amount of the other alkylene dicarboxylic acid component is more than 30% by weight, the melting point of the product may undesirably decrease.

A diol reactant of 2 to 6 carbon atoms is preferred and a representative diol of 2 to 6 carbon atoms is a single diol or a plurality of diols selected from the group of ethylene glycol, 1,3-propanediol, 1,4-butanediol, 1,6-hexanediol, and more preferably is 1,4-butanediol when a single diol is used, and when a plurality of diols is employed, 1,4-butanediol is preferably one of the diols.

The weight ratio of 1,4-butanediol to other diols of the plurality of diols is preferably 50:50–100:0.

The amount of other diols in the plurality of diols has an effect on the melting point of the polymer, and if the amount of other diols is more than 50% by weight, the properties of the product may be adversely affected such as the melting point.

The mole ratio of the dicarboxylic acid to diol is preferably 1:1.2–2.

If the mole ratio of diol reactant to dicarboxylic acid reactant is less than 1.2, the color of the resin is inferior and the reactivity decreases. If the mole ratio is more than 2, increases in cost of preparation are undesirably incurred for any improvement of reactivity gained.

The temperature at which the esterification or ester-exchange reaction is conducted preferably ranges from 190° to 220° C.

Tetrabutyl titanate catalyst can be used alone as the catalyst or a mixture of tetrabutyl titanate and one or more other catalysts selected from the group consisting of calcium acetate, zinc acetate, dibutyltinoxide and tetrapropyl titanate which is added to the reaction medium at the initiation of esterification or the ester-exchange reaction.

The amount of catalyst(s) of the esterification or the ester-exchange reaction employed preferably ranges from 0.005 to 2% by weight. If the amount of catalyst is less than 0.005 wt. %, the reaction rate is low. On the other hand, if the amount of catalyst exceeds 2 wt. %, the color of polymer is inferior although the reaction rate is high.

At the end of the esterification or ester-exchange reaction or at the start of the polycondensation reaction dibutyltinoxide can be added alone as the catalyst or as a component of a plurality of catalysts, wherein the other catalysts are selected from the group consisting of tetrabutyl titanate, tetrapropyl titanate, calcium acetate and tetraisopropyl titanate.

The amount of catalyst(s) of the polycondensation is preferably in the range of 0.2 to 1.5 wt. %. If the amount of catalyst employed is less than 0.2 wt. %, the inherent viscosity and molecular weight of the product do not increase and the reaction rate is low. If the amount of catalyst used exceeds 1.5 wt. %, the color of the product is inferior although the reaction rate is high.

A stabilizer should be added to the reaction medium while taking the color of the resulting resin product into consideration. Suitable stabilizers include trimethyl phosphate alone or a mixture of trimethyl phosphate with one or more other stabilizers selected from the group consisting of neopentyl-diaryl-oxytriphosphate, triphenylphosphine, triphenylphosphate and phosphate. The amount of stabilizer employed preferably ranges from 0.1 to 0.8 wt. %. If the amount of stabilizer used is less than 0.1 wt. %, the effect of the stabilizer is not sufficient, and if the amount exceeds 0.8 wt. %, the time required for the reaction is extended and the properties of the product are adversely affected.

A small amount of an adjusting agent of less than 0.015 wt. % can be added to the reaction mixture to prevent the polymer from yellowing.

The polycondensation temperature preferably ranges from 240° to 270° C. If the reaction temperature is less than 240° C., the time required for the polycondensation reaction is extended. If the temperature exceeds 270° C., the polymer is pyrolyzed and the resin color is bad.

The time required for the polycondensation reaction preferably ranges from 250 to 360 min and is affected by the amount of catalyst and stabilizer employed. The longer the polycondensation period, the higher the molecular weight. Therefore, the time required for the polycondensation reaction should be controlled according to the molecular weight of the product desired.

In addition, to the resin product of the present invention can be added an inorganic filler such as talc or calcium carbonate in an amount of 5 to 60 wt. %. Such compounded materials provide advantages such as low cost, improved tensile strength and low melt index.

Because the so-obtained thermoplastic biodegradable resin exhibits improved biodegradability and properties which prevent environmental pollution, it is useful as a resin material for the preparation of medical, agricultural and fishery and packaging materials, and also as a raw material for the manufacture of office supply items and electric home appliances, as well as other areas including industry where biodegradability is required.

Having now generally described this invention, a further understanding can be obtained by reference to certain specific examples which are provided herein for purposes of illustration only and are not intended to be limiting unless otherwise specified.

EXAMPLE 1

146 g of dimethylsuccinate, 162 g of 1,4-butanediol and 0.03 g of tetrabutyl titanate as catalyst is added to a heat-melting condensation reactor, and the mixture is esterified until the approximate theoretical amount of methanol is produced at the temperature of 200° C.

After the ester exchange step is completed, 0.3 g of tetrabutyl titanate, 0.8 g of dibutyltinoxide as catalyst, 0.4 g of trimethyl phosphate as stabilizer and 0.01 g of cobalt acetate as adjusting agent slurried in 1,4-butanediol is added thereto and mixed for 10 min at the temperature of 230° C. and then the temperature is elevated to 250° C. and polycondensation is allowed to proceed for 5 hrs under 0.3 mmHg pressure. The product is then removed from the reactor.

EXAMPLES 2–15

The same procedure as described in Example 1 is conducted with the amounts of components shown in Table 1. The reaction mixture is esterified until the approximate theoretical amount of water is produced in the case of using succinic acid.

COMPARATIVE EXAMPLE 1

118 g of succinic acid and 127.5 g of 1,4-butanediol are added to a heat-melting condensation reactor and mixed under an atmosphere of nitrogen, and esterified until the approximate theoretical amount of water is produced at the temperature of 210° C.

After esterification is completed, 0.6 g of tetrabutyl titanate slurried in 1,4-butanediol is added thereto under an atmosphere of nitrogen.

The above mixture is mixed for 10 min at the temperature of 200° C. and the temperature is elevated to 220° C. and allowed to polycondense for 5 hrs under 0.3 mmHg pressure. The product is then removed from the reactor.

The various properties in the examples and comparative examples were measured in accordance with the following procedures.

COMPARATIVE EXAMPLE 2

118 g of succinic acid and 85 g of ethyleneglycol are added to a heat-melting condensation reactor and mixed under an atmosphere of nitrogen and esterified until the approximate theoretical amount of water is produced at a temperature of 210° C.

After esterification is completed, 0.5 g of tetrabutyl titanate slurried in ethylene glycol is added thereto under an atmosphere of nitrogen.

The above ingredients are mixed for 10 min at the temperature of 200° C. and the temperature is elevated to 220° C. and allowed to polycondense for 5 hrs under 0.3 mmHg pressure. The product is then removed from the reactor.

The amounts of components of the reaction and the properties of the prepared resin are provided in Table 1.

Measuring Methods

1. Intrinsic viscosity: measured at 30° C. in o-chlorophenol.

2. Melting point: measured using a Differential Scanning Calorimeter (DSC)

3. Molecular weight: measured in a mixed solvent of o-chlorophenol and chloroform using gel-chromatography 4. Biodegradability: measured using the procedure of ASTM-D4300.

After 100 mg of 40 μm thickness of aliphatic polyester film was added to 100 μ mole of phosphoric acid buffer solution (pH 7.0), 0.2 mg of Aspergillus Niger was added thereto to make 1 liter volume of total reaction solution.

After this reaction solution was stirred at 150 rpm for days at a temperature of 37° C., the sample was extracted and biodegradability was estimated by change of molecular weight.

$$\text{Percentage of weight reduction} = \frac{Wi - Wf}{Wi} \times 100$$

(wherein Wi is the initial weight, Wf is the weight after 60 days)

What is claimed as new and is desired to be secured by letters patent of the United States is:

1. A thermoplastic biodegradable aliphatic polyester consisting essentially of an aliphatic polyester having a number average molecular weight of 25,000–45,000, which is prepared by polycondensing one or a plurality of aliphatic dicarboxylic acids presented by formula (I) with one or a plurality of aliphatic diols represented by formula (II):

$$ROOC\text{—}(\text{—}CH_2\text{—})_n\text{—}COOR \quad (I)$$

$$HO\text{—}(\text{—}CH_2\text{—})_m\text{—}OH \quad (II)$$

|  | EXAMPLES | | | | | | | | |
|---|---|---|---|---|---|---|---|---|---|
|  | 1 | 2 | 3 | 4 | 5 | 6 | 7 | 8 | 9 |
| succinic acid |  | 118 | 118 | 82.6 | 84.4 |  |  |  |  |
| glutaric acid |  |  |  | 13.2 | 13.2 |  |  |  |  |
| adipic acid |  |  |  |  | 14.6 |  |  |  |  |
| sebasic acid |  |  |  | 40.4 |  |  |  |  |  |
| dimethyl succinate | 146 |  |  |  |  |  | 138.7 | 73 | 138.7 | 87.6 |
| dimethyl glutarate |  |  |  |  |  | 7.8 | 79.6 |  |  |
| dimethyl adipate |  |  |  |  |  |  |  |  | 16.2 | 81.4 |
| ethylene glycol |  | 15 | 3.1 |  |  |  |  |  |  |
| 1,4-butanediol | 162 | 90.1 | 108.2 | 112.4 | 112.4 | 162.2 | 162.2 | 162.2 | 162.2 |
| intrinsic viscosity | 1.5 | 1.3 | 1.5 | 1.32 | 1.38 | 1.47 | 1.37 | 1.38 | 1.47 |
| No. average molecular weight | 44714 | 26400 | 36514 | 31416 | 33415 | 31400 | 27127 | 29410 | 28400 |
| Melting point (°C.) | 118 | 98.5 | 115 | 63 | 100 | 108.9 | 67.9 | 102.9 | 67.1 |
| percentage of weight reduction (%) | 84 | 98 | 91 | 98 | 93 | 92 | 97 | 93 | 94 |
| reaction time (min) | 300 | 300 | 300 | 300 | 300 | 300 | 300 | 300 | 300 |

|  | EXAMPLES | | | | | | COMPARATIVE EXAMPLES | |
|---|---|---|---|---|---|---|---|---|
|  | 10 | 11 | 12 | 13 | 14 | 15 | 1 | 2 |
| succinic acid |  |  |  |  |  |  | 118 | 118 |
| glutaric acid |  |  |  |  |  |  |  |  |
| adipic acid |  |  |  |  |  |  |  |  |
| sebasic acid |  |  |  |  |  |  |  |  |
| dimethyl succinate | 146 | 146 | 146 | 146 | 146 | 146 |  |  |
| dimethyl glutarate |  |  |  |  |  |  |  |  |
| dimethyl adipate |  |  |  |  |  |  |  |  |
| ethylene glycol | 18.6 | 6.2 | 6.2 |  |  |  |  | 85 |
| 1,4-butanediol | 162 | 144 | 144 | 153 | 117.1 | 153 | 127.5 |  |
| 1,3-propane diol |  | 7.6 |  | 7.6 | 38 | 12.4 |  |  |
| 1,6-hexane diol |  |  | 11.8 |  |  |  |  |  |
| intrinsic viscosity | 1.5 | 1.47 | 1.31 | 1.47 | 1.38 | 1.5 | 0.84 | 0.67 |
| No. average molecular weight | 38000 | 34454 | 31410 | 39140 | 30142 | 43400 | 16200 | 11800 |
| Melting point (°C.) | 110.9 | 103 | 97 | 112 | 84 | 115.5 | 120 | 110 |
| percentage of weight reduction (%) | 91 | 95 | 97 | 90 | 91 | 93 | 90 | 93 |
| reaction time (min) | 300 | 300 | 300 | 300 | 300 | 300 | 300 | 300 |

The resin products of the comparative examples, because of their low molecular weights and viscosities, are not suited for the formation of molded articles.

Having now fully described the invention, it will be apparent to one of ordinary skill in the art that many changes and modifications can be made thereto without departing from the spirit or scope of the invention as set forth herein.

wherein R and R' are both hydrogen or are both methyl, n is 2 to 8 and m is 2 to 6.

2. A method of preparing a biodegradable thermoplastic aliphatic polyester comprising reacting an aliphatic dicarboxylic acid of 4 to 10 carbon atoms and an aliphatic diol of 2 to 6 carbon atoms in a first stage of an esterification or an ester exchange reaction and a final stage of a polycondensation reaction, wherein, from 0.005 to 2 weight % of tetrabutyl titanate or a mixture of tetrabutyl titanate and at least one catalyst selected from the group consisting of calcium acetate, zinc acetate, dibutyltinoxide and tetrapropyl titanate is present in the first stage of esterification or ester exchange reaction and wherein from 0.2 to 1.5 weight % of dibutyltinoxide or dibutyltinoxide and at least one other catalyst selected from the group consisting of tetrabutyl titanate, tetrapropyl titanate, calcium acetate and tetraisopropyl titanates, 0.1 to 0.8 weight % of a stabilizer and less than 0.015 weight % of an adjusting agent are added to the reaction at the end of the esterification or ester exchange reaction or at the start of polycondensation.

3. The method of claim 2, wherein said aliphatic dicaraboxylic acid reactant is succinic acid or dimethyl succinate or a mixture of aliphatic dicarboxylic acid reactants containing succinic acid or dimethyl succinate.

4. The method of claim 2, wherein said aliphatic diol is one or more aliphatic diols selected from the group consisting of ethylene glycol, 1,3-propane diol, 1,4-butanediol, and 1,6-hexanediol.

5. The method of claim 2, wherein the mole ratio of said aliphatic dicarboxylic acid to said alipahtic diol ranges from 1:1.2–2.

6. The method of claim 2, wherein said stabilizer is trimethylphosphate or mixture of trimethylphosphate and one or more stabilizers selected from the group consisting of neopentyl-diaryl-oxytriphosphate, triphenyl phosphine, triphenyl phosphate and phosphate.

7. The method of claim 2, wherein said adjusting agent is cobalt acetate.

8. The method of claim 2, wherein the temperature of said polycondensation reaction is 240°–270° C.

9. The method of claim 2, wherein the time of said polycondensation reaction ranges from 250–360 min.

* * * * *

UNITED STATES PATENT AND TRADEMARK OFFICE
CERTIFICATE OF CORRECTION

PATENT NO. : 5,470,941
DATED : November 28, 1995
INVENTOR(S) : Hyo Yeol KIM, et al.

It is certified that error appears in the above-indentified patent and that said Letters Patent is hereby corrected as shown below:

On the title page, Item [75], the fourth inventor's name should read:

--Soo Il Cho--

Signed and Sealed this

Nineteenth Day of March, 1996

Attest:

BRUCE LEHMAN

*Attesting Officer*  *Commissioner of Patents and Trademarks*